No. 765,511. PATENTED JULY 19, 1904.
M. F. POTTER.
MILK PAIL ATTACHMENT.
APPLICATION FILED DEC. 15, 1903.
NO MODEL. 2 SHEETS—SHEET 1.

Witnesses,
W. H. Palmer.
Emily F. Otis.

Inventor,
Millard F. Potter.
by Lothrop Johnson
his Attorneys.

No. 765,511. PATENTED JULY 19, 1904.
M. F. POTTER.
MILK PAIL ATTACHMENT.
APPLICATION FILED DEC. 15, 1903.
NO MODEL. 2 SHEETS—SHEET 2.

Witnesses,
W. H. Palmer
Emily F. Otis

Inventor,
Millard F. Potter.
by Lothrop Johnson
his Attorneys.

No. 765,511. Patented July 19, 1904.

UNITED STATES PATENT OFFICE.

MILLARD F. POTTER, OF ALBERT LEA, MINNESOTA.

MILK-PAIL ATTACHMENT.

SPECIFICATION forming part of Letters Patent No. 765,511, dated July 19, 1904.

Application filed December 15, 1903. Serial No. 185,197. (No model.)

*To all whom it may concern:*

Be it known that I, MILLARD F. POTTER, a citizen of the United States, residing at Albert Lea, in the county of Freeborn and State of Minnesota, have invented certain new and useful Improvements in Milk-Pail Attachments, of which the following is a specification.

My invention relates to improvements in milk-pail attachments designed to screen the milk as it passes into the pail and to hold the milk in the pail when the pail is upset.

To this end my invention consists in the features of construction and combination hereinafter particularly described and claimed.

Figure 1:
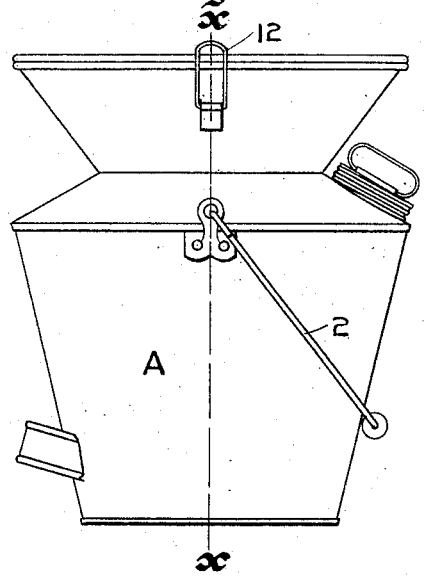
Figure 3:
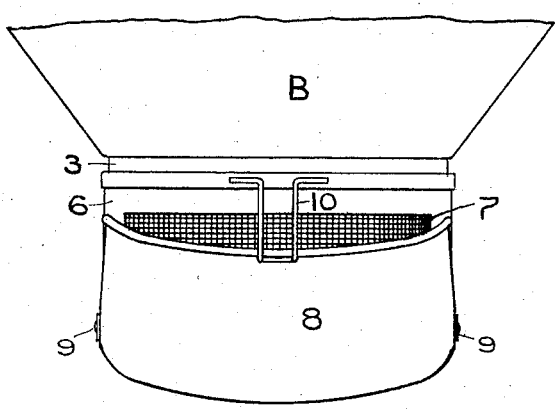
Figure 4:
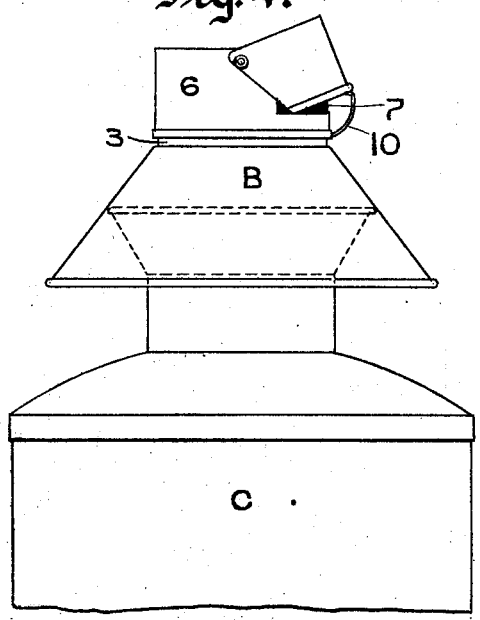
Figure 5:
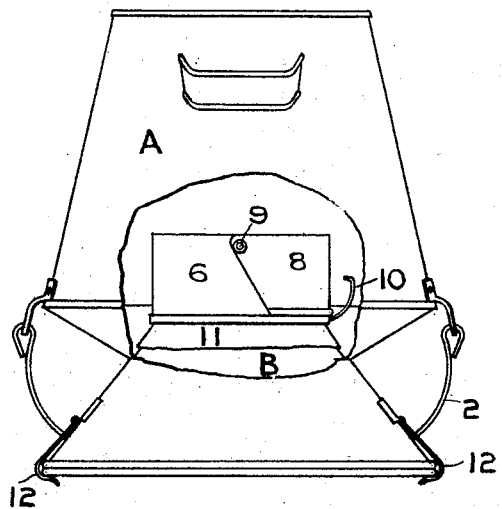
Figure 2:
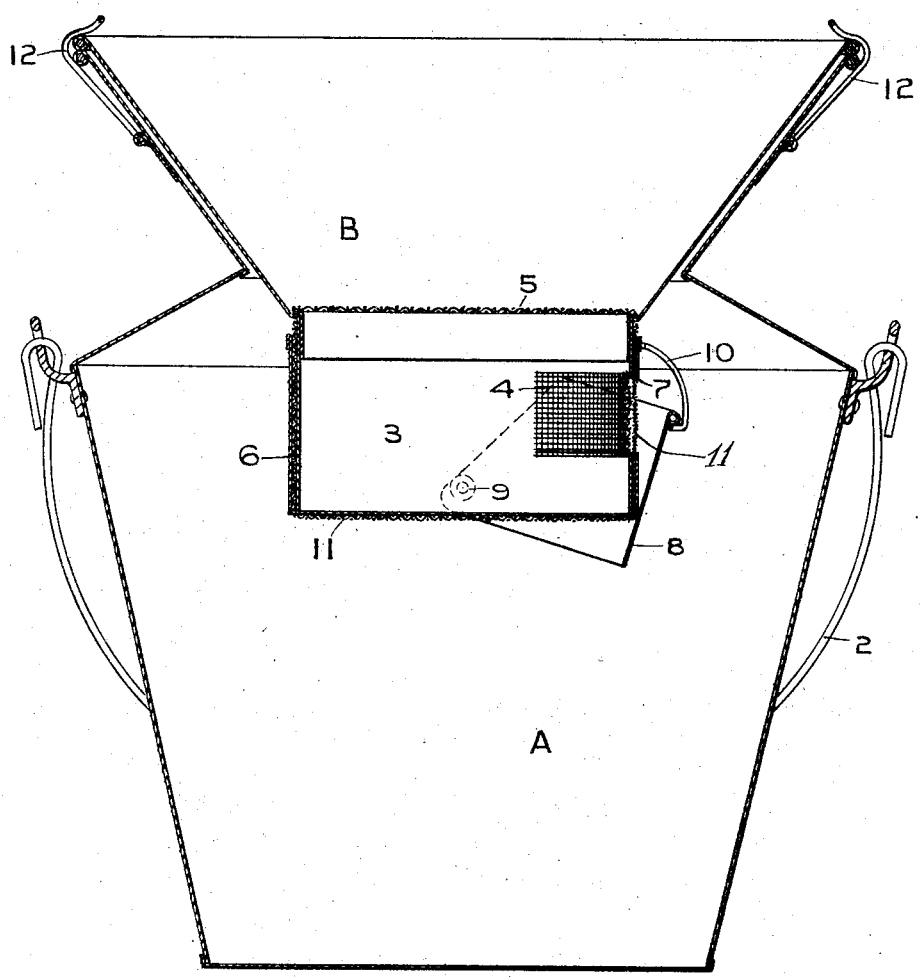

In the accompanying drawings, forming part of this specification, Figure 1 is a side elevation of a milk-pail fitted with my attachment. Fig. 2 is a section on line $x\ x$ of Fig. 1. Fig. 3 is a side elevation of the attachment. Fig. 4 is a side elevation of the upper portion of a milk-can shown covered by my improved attachment; and Fig. 5 is a side elevation of a milk-pail fitted with my attachment, the pail being shown inverted and partially broken away.

In the drawings, A represents an ordinary milk-pail provided with a suitable bail 2. Adapted to be fitted within the opening of the pail is a funnel B, formed with a closed bottom bucket portion 3. Formed in the side of the portion 3 some distance above the bottom is a screened opening 4. Removably fitted in the top of the bucket portion 3 of the funnel is a strainer 5.

Removably fitted over the lower end of the funnel is a collar 6, formed in one side with an opening 7, adapted to register with the screened opening 4. The opening 7 is covered by a flap 8, having hinge-support 9 upon the outside of the collar 6. The opening movement of the flap is limited by a spring-stop 10, extending outwardly and downwardly from the collar.

As illustrated in Fig. 2, the flap or valve 8 will normally stand turned upon its pivot against the stop 10, freeing the opening 7. When the pail is inverted, as shown in Fig. 5, the weight of the flap will cause it to turn upon its pivot and close the opening 7, thus preventing any milk within the pail from running out through said opening.

As shown in Fig. 2, the screened opening 4 in the bucket portion of the funnel is covered with suitable fabric 11, the fabric extending around the side and over the bottom of the bucket portion and being held in place by the removable collar 6, which is constructed to fit tightly around the bucket portion. The funnel is held in the neck of the pail by hinged catches 12.

In use with the attachment in place, as shown in Fig. 2, the milk will pass through the strainer 5 into the bucket portion of the funnel and thence through the screen 4 and the fabric 11, covering it, into the pail. In passing through the funnel any particles of foreign matter which succeed in passing through the strainer 5 will settle in the bottom of the funnel B below the screen 4.

When the attachment is to be used with a milk-can, it is placed upon the can C in inverted position, as shown in Fig. 4. With this use of the attachment the flap 8 is turned outwardly past the stop 10, so as to rest upon the stop, as shown, thus allowing air to pass through the screen 6 to ventilate the milk.

Having now described my invention, what I claim as new, and desire to secure by Letters Patent, is—

1. An attachment for milk-pails comprising a funnel constructed to fit in the mouth of a pail and having a downwardly-extending closed bottom bucket portion, the bucket portion having a screened opening in its side, a fabric covering said opening and extending around the side of the bucket portion, a removable collar fitting around the fabric-covered bucket portion and a pivotally-supported flap in position to cover the screened opening when the pail is tipped.

2. The combination, with a milk-pail, of a funnel constructed to fit in the mouth of said pail, a central downwardly-projecting closed bottom bucket portion carried by said funnel, said bucket portion being formed with a screened opening in its side, a collar removably fitted over said bucket portion and provided in one side with a hinged flap arranged in position to cover said screened opening.

3. An attachment of the class described, consisting of a funnel provided with a central downwardly-extending bucket portion having a closed bottom, said bucket portion having a screened opening in its side wall, a collar fitted over said bucket portion and formed with an opening registering with said screened opening, a flap pivotally supported upon the sides of said collar in position to cover said screened opening, and a downwardly and outwardly extending spring-stop carried by said collar and engaging said flap to hold the same in open position.

4. An attachment for milk-pails comprising a funnel constructed to fit in the mouth of a pail and having a downwardly-extending closed bottom bucket portion, the bucket portion having a screened opening in its side, a fabric covering upon the side and bottom of the bucket portion, a removable collar fitting over the fabric-covered bucket portion and having an opening registering with the screened opening in the bucket portion, and a flap pivotally supported upon the collar in position to cover said opening when the pail is tipped.

In testimony whereof I affix my signature in presence of two witnesses.

MILLARD F. POTTER.

Witnesses:
H. S. JOHNSON,
EMILY F. OTIS.